May 19, 1925.
G. W. WESCHE
1,538,310
HYDROCARBON BURNER
Filed May 20, 1924
2 Sheets-Sheet 1
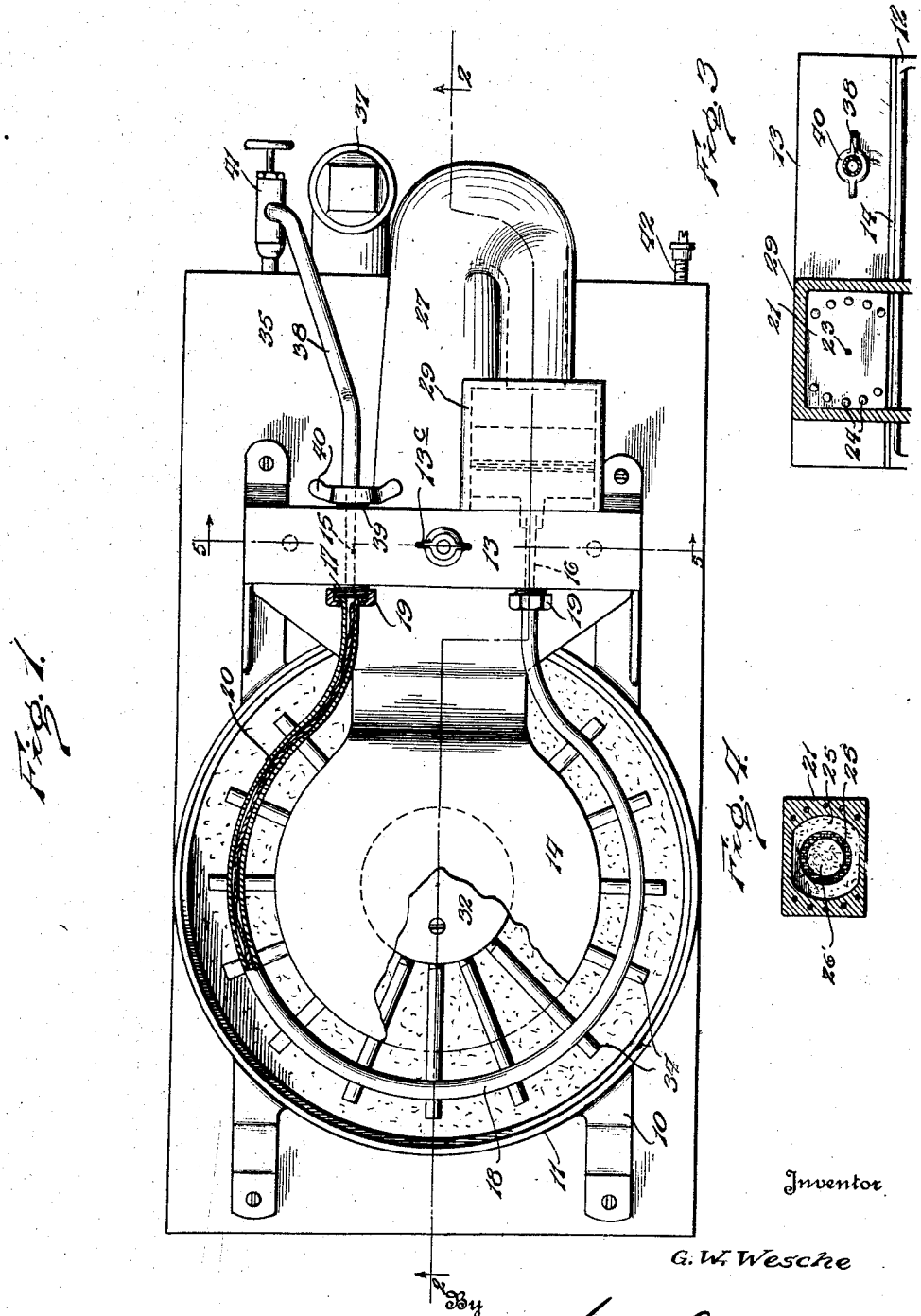
Inventor
G. W. Wesche
By Lacy & Lacy, Attorneys May 19, 1925. 1,538,310
G. W. WESCHE
HYDROCARBON BURNER
Filed May 20, 1924 2 Sheets-Sheet 2
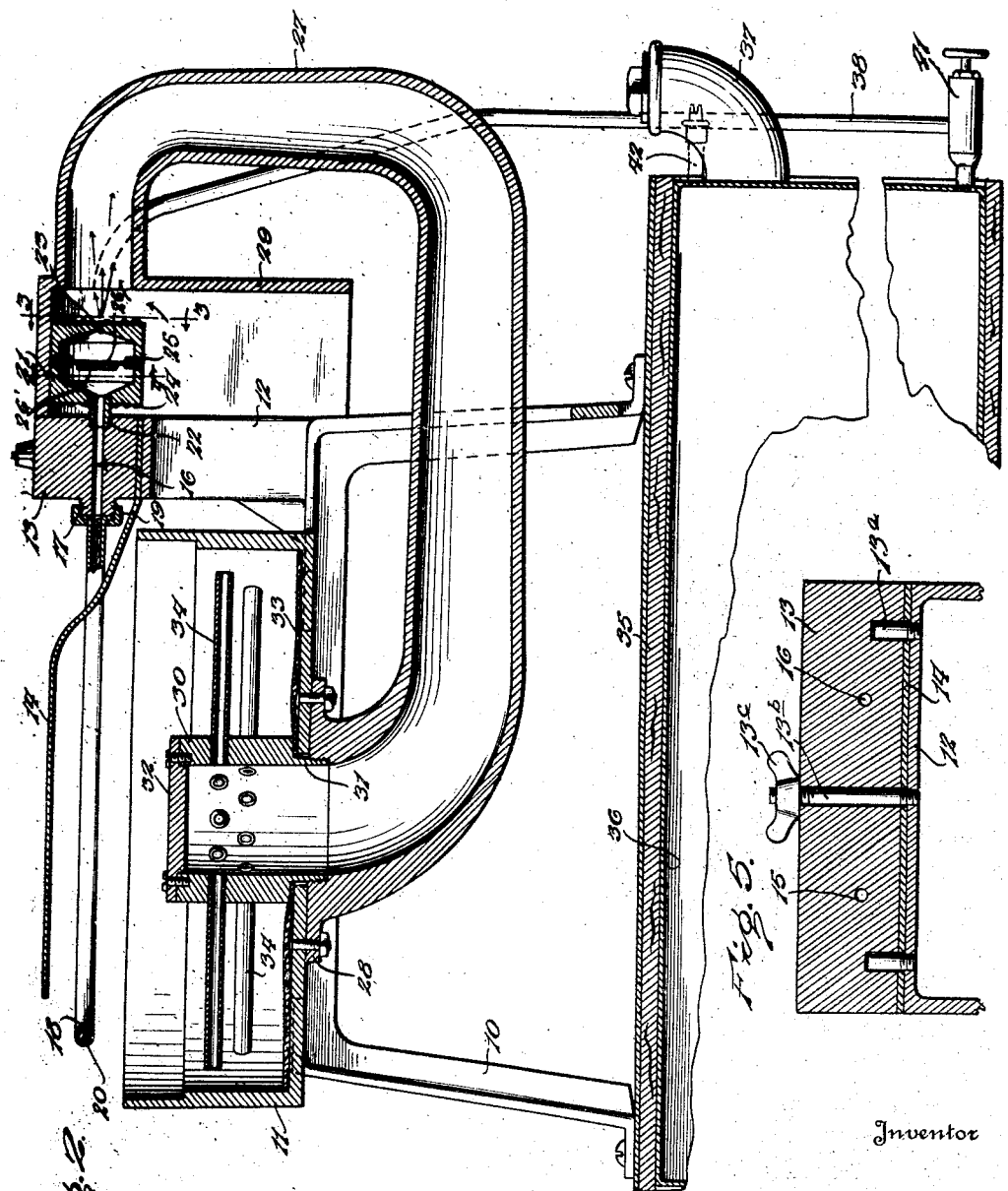
Inventor
G. W. Wesche
By Lacey & Lacey, Attorneys Patented May 19, 1925.

1,538,310

UNITED STATES PATENT OFFICE.

GEORGE W. WESCHE, OF WELLSVILLE, NEW YORK.

HYDROCARBON BURNER.

Application filed May 20, 1924. Serial No. 714,639.

*To all whom it may concern:*

Be it known that I, GEORGE W. WESCHE, a citizen of the United States, residing at Wellsville, in the county of Allegany and State of New York, have invented certain new and useful Improvements in Hydrocarbon Burners, of which the following is a specification.

This invention relates to an improved hydrocarbon burner and seeks, among other objects, to provide a simple and yet highly efficient burner which, from a given quantity of fuel, will produce more heat than other burners of like character as now offered on the market.

The invention seeks, as a further object, to provide a burner which will be noiseless, odorless, and free from carbon deposits.

And the invention seeks, as a still further object, to provide a burner which may be readily assembled or disassembled and thus readily capable of repair, and which will be adapted for general use.

Other and incidental objects will appear hereinafter.

In the drawings:

Figure 1 is a plan view of my improved burner,

Figure 2 is a vertical sectional view on the line 2—2 of Figure 1, looking in the direction of the arrows, Figure 3 is a detail sectional view on the line 3—3 of Figure 2, Figure 4 is a detail sectional view on the line 4—4 of Figure 2, looking in the direction indicated by the arrows, and Figure 5 is a sectional view on the line 5—5 of Figure 1, looking in the direction indicated by the arrows.

In carrying the invention into effect, I employ a stand 10 on which is integrally formed a circular burner bowl 11 and rising from the stand at one end thereof is an inverted U-shaped bracket which is also integral with the stand so that preferably the stand, bowl and bracket thus comprise a single unit. Mounted upon the bracket 12 is an oblong header block 13 recessed near its ends to freely receive studs 13ᵃ upstanding from the bracket and mounted upon the bracket to extend freely through the block centrally thereof is a rod 13ᵇ carrying a thumb nut 13ᶜ detachably securing the block in position. Clamped at one end between said block and the bracket is a flame spreader 14 extending over the bowl 11 thereabove. Near its ends, the block 13 is provided with transverse passages 15 and 16 therethrough and formed on the block at the forward ends of said passages are nipples 17. Detachably connected at its ends to said nipples is a horseshoe-shaped generator tube 18 attached to the nipples by nuts 19 and extending from end to end of the tube is an asbestos or other suitable fibrous member 20, for collecting carbon deposited by the liquid fuel when the burner is operated at low temperatures. As will be observed, the generator tube is centered with respect to the bowl 11 and extends horizontally thereabove in parallel relation to the bowl. Mounted upon the block 13 at the passage 16 is an injector nozzle 21 which, as shown in Figure 2, is composed of companion sections one of which is formed with a nipple 22 screwed into said passage while the other of the sections is provided with an alined outlet orifice 23. The sections of the nozzle are detachably connected by rods or other suitable fastening elements 24 and clamped between said sections is a laminated asbestos gasket 25 between the laminations of which is held an atomizing screen 26. Secured to the screen centrally of the opening through the gasket is a circular asbestos baffle 26' centered with respect to the nipple 22. Thus, fuel vapors issuing from the nipple will strike the baffle to be spread out into a circular sheet thereby when the vapors will pass over the edge of the baffle and through the screen 26 to be atomized by the screen. Any liquid particles in the fuel vapors will accordingly be broken up while the vapors will be prevented from impinging directly against the screen to force liquid particles therethrough.

Mounted upon the bottom wall of the bowl 11 is an induction tube 27 gradually tapered in diameter from one end thereof to the other. At its larger end, the wall of the tube is thickened and formed on the tube is an annular flange 28 bolted or otherwise secured to said bottom wall axially of the bowl. The smaller end portion of the tube is arranged to extend upwardly and forwardly to confront the block 13 and formed on the tube at its smaller end is a depending oblong hood 29 fitting over the nozzle 21 to rest thereon abutting the block. As brought out in Figure 2, the hood is open at its forward side next to the burner bowl and is also open at its lower end. Detachably mounted axially of the bowl 11 is a tubular burner head 30 provided at its lower end with a reduced nipple 31 extending freely through a suitable opening in the bottom wall of the bowl 11 and screwed into the adjacent end of the tube 27. Closing the head at its upper end is a removable cover plate 32 and clamped between the head and the bottom wall of the bowl is an appropriate wick 33 of asbestos or the like. Screwed at their inner ends into the head is an upper and lower series of radial burner tubes 34 closely approaching the side wall of the bowl and, as will be observed, the tubes of one series are staggered with respect to the other so that the several tubes are equally spaced circumferentially of the head.

In the present instance, I have provided a base for the stand 10 by employing a casing 35 to which the stand is detachably secured, and removably fitting in the casing is a fuel supply tank 36 provided at one end with a filler pipe 37. Leading from the tank is a fuel feed pipe 38 and formed on the outer side of the block 13 at the adjacent end of the passage 15 is a nipple 39 to which the pipe is detachably connected by a nut 40. Interposed in the pipe adjacent the tank is a suitable shut-off valve 41 and projecting from the adjacent end wall of the tank is an appropriate air valve 42 to which a suitable pump may be attached for forcing air into the tank so that the fuel contained by the tank may be delivered through the pipe 38 by air pressure. However, if preferred, the tank may be mounted at a suitable elevation above the burner so that the liquid fuel will gravitate to the burner.

The burner is started by saturating the wick 33 and igniting the fuel in the bowl so that the generator tube 18 will be heated. The valve 41 is then opened, when the fuel will flow into said generator tube. The fuel will thus be vaporized in said tube and the fuel vapors superheated to form a fuel gas, which gas will issue into the nozzle 21 to flow through the screen 25 and filter member 26, when the gas will issue through the orifice 23 of the nozzle into the adjacent end of the induction tube 27. Air will accordingly be drawn in through the hood 29 to flow through the tube along with the fuel gas so that the air and gas will become commingled to produce a highly combustible fuel mixture which will issue through the burner tubes to be ignited at the outer ends thereof. The flame thus produced will be confined and directed by the bowl to rise upwardly about the generator tube 18 so that as soon as the burner is in operation this tube will be highly heated. A corresponding effective vaporization of the liquid fuel and superheating of the fuel gas will thus be realized with the result that practically perfect combustion of the final fuel mixture will be had. Accordingly, an intensely hot flame will be produced while, at the same time, carbon deposits will be minimized. Since the head 29 of the tube 27 is open at the side thereof next to the bowl, the air drawn into the hood will be heated while the heat radiating from the bowl will serve to appreciably heat the hood as well as the injector nozzle 24. Furthermore, it is to be noted that since the induction tube 27 is gradually increased in diameter toward the discharge end of the tube, the fuel gas will, as it flows through the tube, be allowed to expand somewhat and accordingly take up the heat from the metal of the tube while the flow of gas and air through the tube will be accelerated to overcome possible back firing.

Having thus described the invention, what I claim is:

1. A hydrocarbon burner including a stand unit comprising a bowl and a bracket upstanding adjacent the bowl, a header block mounted upon said bracket, a gas generating tube mounted upon said block to extend over the bowl, a nozzle mounted upon the block to communicate with one end with said tube, an induction horn connected at one end to said unit and provided at its opposite end with a hood fitting over said nozzle, burner tubes mounted in the bowl to communicate with the former end of said horn, and a flame spreader clamped between the block and bracket to extend over the bowl.

2. A hydrocarbon burner including a bowl open at its upper end, an induction tube associated therewith, a nozzle mounted to discharge into one end of said tube, a gas generating tube extending over the open end of the bowl, and burner tubes mounted in the bowl to communicate with the opposite end of said induction tube and disposed to discharge against the wall of the bowl whereby the bowl will confine the flame at the outer ends of said burner tubes to rise upwardly over said generating tube.

3. A hydrocarbon burner including a bowl open at its upper end, an induction tube associated therewith, a nozzle mounted to discharge into one end of said tube, a gas generating tube extending over the open end of the bowl, burner tubes mounted in the bowl to communicate with the opposite end of said induction tube and disposed to discharge against the wall of the bowl whereby the bowl will confine the flame at the outer ends of said burner tubes to rise upwardly over said generating tube, and a spreader disposed above the generating tube for deflecting the flame downwardly thereagainst.

4. A hydrocarbon burner including a circular bowl open at its upper end, an induction tube associated therewith, a nozzle mounted to discharge into one end of the tube, a gas generating tube extending over the open end of the bowl and conforming throughout the major portion of the length thereof to the circular contour of the bowl, and radial burner tubes mounted in the bowl to communicate with the opposite end of said induction tube and disposed to discharge against the wall of the bowl whereby the bowl will confine the flame at the outer ends of said burner tubes to rise upwardly over said generating tube.

5. A hydrocarbon burner including a bowl open at its upper end, an induction tube fixed at one end to the bottom of the bowl, a nozzle mounted to discharge into the opposite end of said tube, a gas generating tube extending over the open end of the bowl, a burner head extending freely through the bottom of the bowl and removably secured in the adjacent end of said induction tube, and burner tubes extending from said head and disposed to discharge against the wall of the bowl whereby the bowl will confine the flame at the outer ends of said burner tubes to rise upwardly over said generating tube.

6. A hydrocarbon burner including a stand unit having legs and comprising a bowl open at its upper end and a bracket upstanding adjacent the bowl, a header block mounted upon said bracket, a gas generating tube mounted upon said block to extend over the open end of the bowl, a nozzle mounted upon the block to communicate with one end of said tube, an induction tube fixed at one end to said bowl and provided at its opposite end with a hood disposed over said nozzle, and burner tubes mounted in the bowl to communicate with the former end of said induction tube and disposed to discharge against the wall of the bowl whereby the bowl will confine the flame at the outer ends of said burner tubes to rise upwardly over said generating tube.

7. A hydrocarbon burner including a bowl open at its upper end, a bracket upstanding adjacent the bowl, a header block mounted upon the bracket, a gas generating tube mounted upon said block to extend over the open end of the bowl, a nozzle mounted upon the block to communicate with one end of said tube, an induction tube disposed to cooperate with the nozzle and connected with the bowl, burner tubes mounted within the bowl to communicate with said induction tube and disposed to discharge against the wall of the bowl whereby the bowl will confine the flame at the outer ends of said burner tubes to rise upwardly over said generating tube, and means detachably connecting the header block with the bracket whereby the header block, generating tube and nozzle may be displaced as a unit.

8. In a hydrocarbon burner, a nozzle including mating sections recessed to form a chamber therebetween, one of said sections being provided with an inlet tube and the other of said sections being provided with an outlet orifice opposite said tube, a screen clamped between the sections to extend across said chamber between said tube and orifice, and a baffle carried by the screen opposite the inner end of said tube.

In testimony whereof I affix my signature.

GEORGE W. WESCHE. [L. S.]